Sept. 2, 1952  H. H. RANNEY  2,609,252
WEAR-COMPENSATING SPINDLE HEAD
Filed Aug. 29, 1946
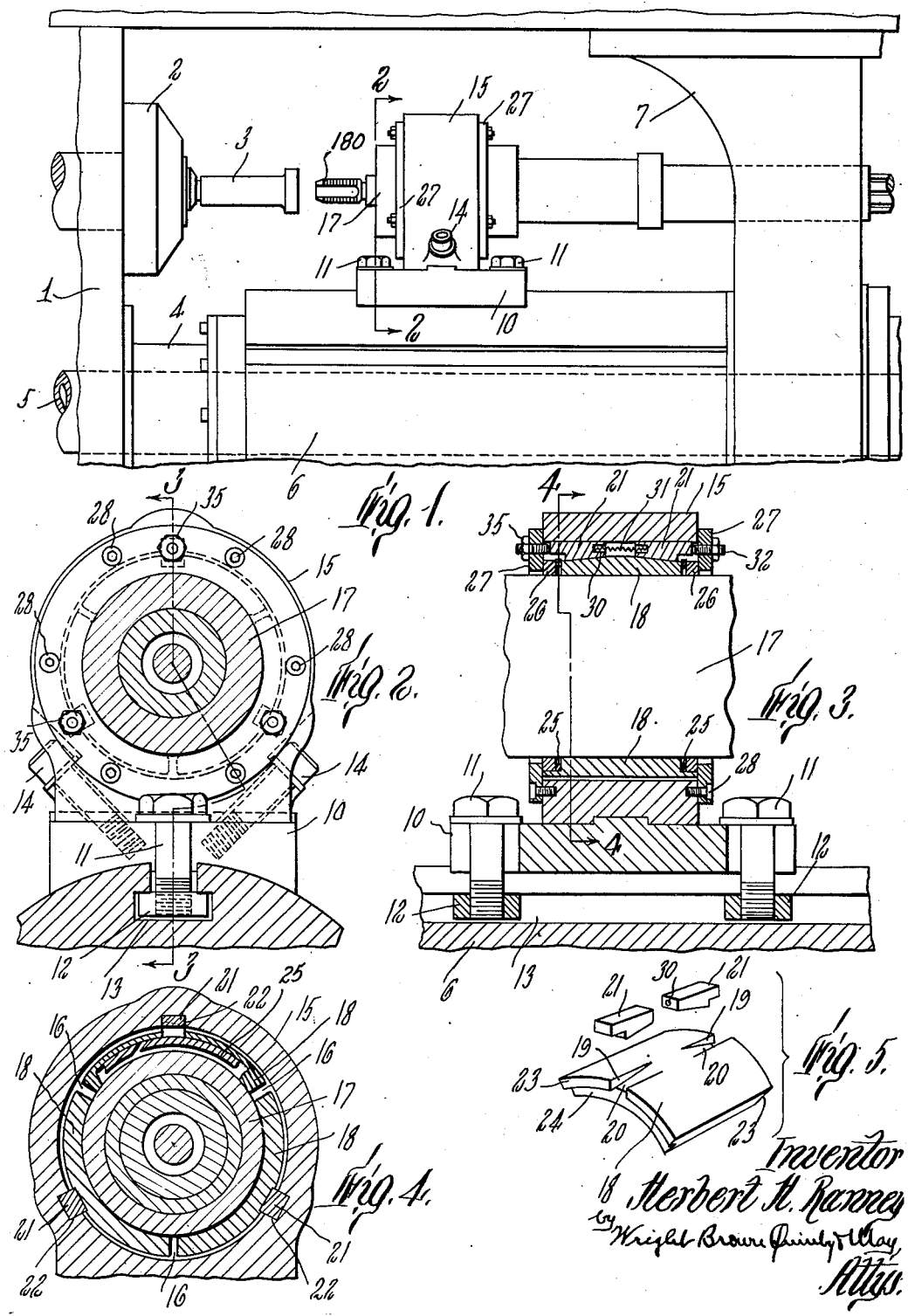

Patented Sept. 2, 1952

2,609,252

UNITED STATES PATENT OFFICE 2,609,252

WEAR-COMPENSATING SPINDLE HEAD

Herbert H. Ranney, Windsor, Vt., assignor to Cone Automatic Machine Company Inc., Windsor, Vt., a corporation of Vermont Application August 29, 1946, Serial No. 693,674

4 Claims. (Cl. 308—71)

This invention has for an object to provide compensation for misalignment between parts such as the work spindle and auxiliary tool spindles on lathes and screw machines, particularly for multiple spindle machines. The auxiliary spindle for such a machine is supported by a bearing, in accordance with this invention, which can be adjusted to aline the auxiliary spindle with the work spindle or to bring the two into parallelism with definite spacing.

Referring to the accompanying drawings,

Figure 1 is a fragmentary front elevation of a multiple spindle lathe embodying the invention.

Figure 2 is a detail sectional view on line 2—2 of Figure 1.

Figure 3 is a detail sectional view on line 3—3 of Figure 2.

Figure 4 is a detail sectional view on line 4—4 of Figure 3.

Figure 5 is an exploded perspective view of a segment and its adjusting wedges.

Referring to the drawings, at 1 is indicated a portion of the frame of a multiple spindle lathe of the well known cone type, and at 2 is shown the chuck end of one of the work spindles through which passes a work piece, shown herein as partly machined and extending from the forward end of the spindle at 3. At 4 is shown a tubular support through which a shaft 5 extends, this support carrying thereon a tubular tool carrier 6 provided with an upstanding post 7 and mounted for motion in the direction of the axis of the spindles, the carrier 6 sliding on the tubular bar 4. This motion of the tool slide may be produced by a suitable cam on an overhead cam shaft acting on the post 7 as is well known in the art.

The subject matter of this invention is applied to the machine as thus constructed, as illustrated herein, and it comprises a support 10 which may be secured to the tool slide 6 in place of any of the usual tool supports. To this end it is provided with a pair of bolts 11 spaced lengthwise of the support 10, the inner ends of which are threaded into nuts 12 within a T slot 13 extending longitudinally of the tool slide 6. To the support 10 is secured, as by the inclined screws 14, a sleeve 15. Through this sleeve extends a shaft 17 which constitutes the spindle of one of the end working tools, which as shown herein is a tap 180. In the case of a tap or drill, it is desired that the shaft 17 be in accurate coaxial relation with the work spindle and the work piece 3 and provision is made by which it may be adjusted into such accurate position within the sleeve 15.

It will be noted that the internal diameter of the sleeve 15 is substantially larger than the external diameter of the shaft 17. This permits placing between these parts the segments 18, three such segments being shown in Figure 4, which are arranged to cover substantially the entire periphery of the shaft 17 but are spaced apart at their sides at 16 sufficiently for the desired adjustment.

As shown best in Figure 5, each of the segments 18 is provided at its ends between its side edges with slots 19 having inclined bottom faces 20. In these slots may be positioned wedges 21. The slots 19 act to prevent relative angular motion between the segments and the wedge elements. Likewise the sleeve 15 is provided with slots 22, the sleeve and segment slots being arranged in opposed pairs, for the reception of the wedges so that the segments are held in their desired angular relationships. The ends of the segments are counterbored as at 24 to provide end outward extensions 23 which provide abutments for engagement by a pair of split spring rings 25 and tend by their expansion to press the segments outwardly toward the inner face of the sleeve 15 as far as is permitted by the wedge members 21.

In order to seal off the ends of the sleeve 15 to the shaft 17, two pairs of sealing rings 26 and 27 are employed. The inner rings 26 have internal diameters such as to closely engage the periphery of the shaft 17. The outer rings 27 engage over the outer faces of the rings 26, their inner diameters being somewhat larger than the external diameter of the sleeve 17, and their outer diameters sufficiently large to overlap the ends of the sleeve 15, to which they are attached at suitable angular intervals as by screws 28.

The adjacent ends of each pair of wedge members 21 are provided with sockets 30, and a coil spring 31, engaging at its ends in opposed sockets of the wedge members of each pair, press these wedge members outwardly in such relation as to permit the segments to be moved outwardly from the axis of the shaft 17, but the wedges may be pushed toward each other to wedge the segments 18 inwardly against the shaft 17 by screws 32 threaded through the rings 27 and engaging at their inner ends against the outer ends of the wedge members 21. Lock nuts 35 may be employed to secure the screws 32 in adjusted position. By this means the opposite ends of the segments and the segments individually may be adjusted separately toward the axis of the sleeve 15, thus to provide for centering the shaft 17 in coaxial relation to the work piece 3.

In connection with some end working tools it is not desired that the end working tool shaft 17 be centered with relation to the work, but to be parallel therewith at an accurate distance therefrom, and in such cases the sleeve 15 will be applied to the tool carriage 6 in other than substantially coaxial relation, and may be in one of the other T slots with which such tool carriers are provided. Further adjustment is provided for by the angularly disposed screws 14 which secure the sleeve to the support 10.

From the foregoing description of an embodiment of this invention it will be evident to those skilled in the art that various changes and modifications might be made without departing from the spirit or scope of this invention.

I claim:

1. In combination, a support, a sleeve carried by said support, a shaft extending through said sleeve, segments between said shaft and sleeve, said segments having internally counter bored end portions, split spring rings engaging in said counterbored portions and bearing on said segments for pressing said segments outwardly toward said sleeve, and elements engaging said segments and actuable to force said segments inwardly against said shaft against the yielding pressure exerted by said spring rings.

2. In combination, a support, a sleeve carried by said support, a shaft extending through said sleeve, segments between said shaft and sleeve, alined wedges adjacent to each end of each segment and engaging the corresponding segment and movable in opposite directions to force said segments against said shaft, springs between the adjacent ends of said wedges for forcing said wedges apart, and means independent for each wedge for engaging the outer ends of said wedges for forcing said wedges toward each other.

3. In combination, a support, a sleeve carried by said support, a shaft extending through said sleeve, segments between said shaft and sleeve, each of said segments having a slot extending parallel to said axis and said sleeve having slots opposite to said segment slots, certain of said slots having inclined bases, a wedge in each pair of slots and having an inclined base engaging the base of one of said slots, pairs of overlapping and mutually engaging sealing rings at the ends of said sleeve, the inner one of said rings having an internal diameter to engage the periphery of said shaft and the outer periphery spaced inwardly of said sleeve, and the outer of said rings being secured to said sleeve and having an internal periphery spaced from said shaft, and elements carried by the outer of said rings and operatively engaging said wedges movable to adjust said wedges lengthwise of said axis.

4. In combination, a support, a sleeve carried by said support, a shaft extending through said sleeve, segments between said shaft and sleeve, a wedge between said sleeve and segments at each end of each segment, a member fixed to each end of said sleeve, screws threaded through said members, each screw engaging one of said wedges and being independently adjustable to force the corresponding end of its segment toward the axis of said shaft, spring means engaging said wedges for holding said wedges against said screws, and springs engaging said segments and tending to move said segments away from said axis.

HERBERT H. RANNEY.

REFERENCES CITED

The following references are of record in the file of this patent:

UNITED STATES PATENTS

| Number | Name | Date |
|---|---|---|
| 110,843 | Frisbie | Jan. 10, 1871 |
| 607,114 | Enyart | July 12, 1898 |
| 903,872 | Lagergren | Nov. 17, 1908 |
| 1,280,839 | Rathbun | Oct. 8, 1918 |
| 1,322,332 | Newbigin | Nov. 18, 1919 |
| 1,778,452 | Ernst | Oct. 14, 1930 |
| 2,130,809 | Miller | Sept. 20, 1938 |
| 2,232,843 | Drissner | Feb. 25, 1941 |
| 2,268,944 | Jones | Jan. 6, 1942 |
| 2,376,164 | Miller et al. | May 15, 1945 |

FOREIGN PATENTS

| Number | Country | Date |
|---|---|---|
| 2,156 | Great Britain | 1901 |